Figure 4:
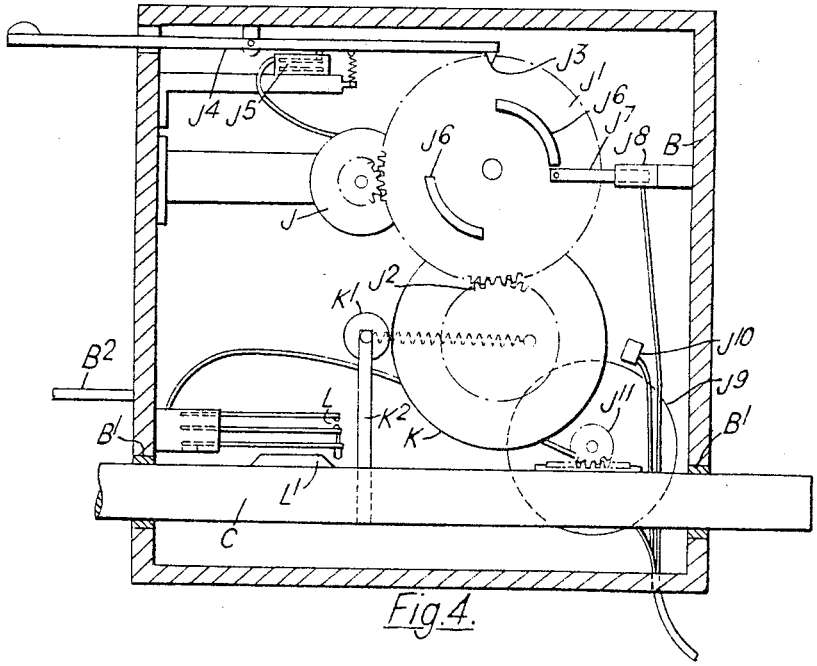

Nov. 8, 1966   R. E. REASON   3,283,568
SURFACE TESTING APPARATUS
Filed March 27, 1964   3 Sheets-Sheet 1
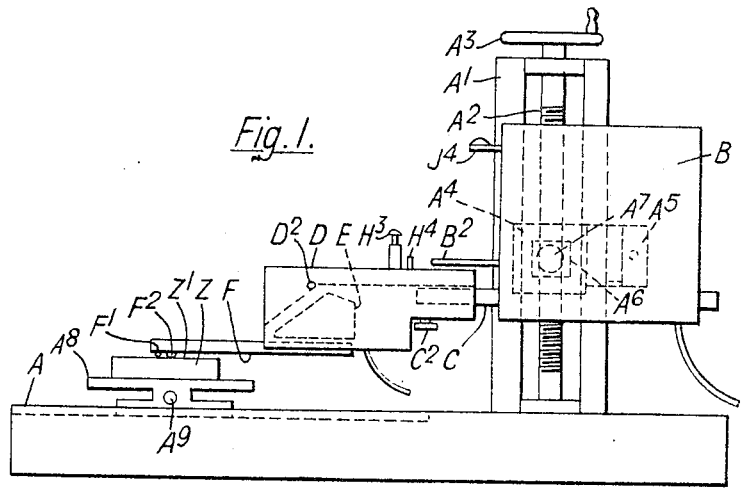
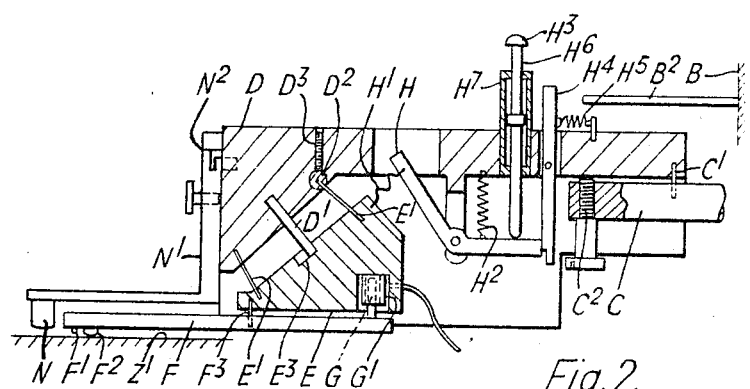
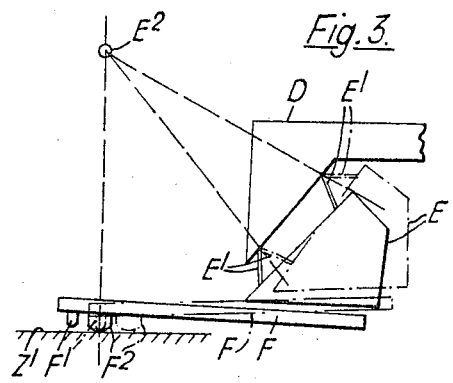
Inventor
R. E. Reason
By
Holcombe, Wetherill & Brisebois
Attorneys Nov. 8, 1966   R. E. REASON   3,283,568
SURFACE TESTING APPARATUS
Filed March 27, 1964   3 Sheets-Sheet 2

Inventor
R. E. Reason
By
Holcombe, Wetherill & Brisbois
Attorneys

United States Patent Office 3,283,568
Patented Nov. 8, 1966

3,283,568
SURFACE TESTING APPARATUS
Richard Edmund Reason, Market Harborough, England, assignor to Rank Precision Industries Limited, trading as The Rank Organisation Rank Taylor Hobson Division, Leicester, England, a British company
Filed Mar. 27, 1964, Ser. No. 355,341
Claims priority, application Great Britain, Apr. 1, 1963, 12,802/63
21 Claims. (Cl. 73—105)

This invention relates to surface testing apparatus for measuring or indicating the roughnesses or undulations of a surface.

It has been proposed for testing surface texture to effect measurment or indication by traversing across the test surface two tracers of differing radius, the theory requiring that in effect the two tracers be mounted for simultaneous independent movement along a common axis generally normal to the test surface, whereby the locus of the centre of curvature of the blunter tracer (hereinafter referred to as the skid) provides a reference line for the sharper tracer (hereinafter referred to as the stylus). Direct realisation of this theory being physically impossible, it has been proposed to separate the stylus and skid in the direction of traverse, to mount each on a pick-up body for independent movement generally normal to the test surface during a common traversing movement, and to determine the differential movement between such stylus and skid in the direction normal to the test surface by means incorporating a time delay device to compensate for their separation.

A disadvantage of the above-described arrangement is that the pick-up tends to be bulky in the region adjacent to the workpiece due to the independent mounting of the tracers, so that the testing of holes or other interior surfaces is rendered difficult or impossible.

An object of the present invention is to provide an alternative arrangement, for testing surface texture relative to a locus afforded by a rounded skid moving across the test surface, wherein the above-mentioned disadvantage of the proposed arrangement is substantially avoided.

The apparatus according to the present invention comprises two tracers constituted by a stylus and a rounded skid adjacently mounted in fixed relationship on a common supporting arm, a pick-up body carrying a pivotal mounting for the supporting arm, such arm being biased about such pivotal mounting to urge the tracers towards the surface under test, changeover means for effecting a predetermined relative displacement between the pivotal mounting and the test surface so that either the stylus only or the skid only is caused to engage the test surface, means for driving the pick-up body to cause the operative tracer to traverse the test surface, whereby by operation of the changeover means the two tracers may be caused successively to traverse the test surface respectively during successive traversing drives, detecting means responsive to pivotal movement of the supporting arm during traversing due to the working movements of the stylus or skid in a direction generally normal to the test surface, and means for comparing the output of the detecting means during traversing of the stylus with the output of such detecting means during traversing of the skid, including a device for temporarily storing at least one of such outputs, to provide a signal for operating a measuring or indicating instrument.

In this way, the pick-up may be made of compact construction in order to facilitate the testing of interior surfaces.

The predetermined relative displacement between the pivotal mounting and the test surface is preferably effected by movement of such pivotal mounting generally in a direction transverse to the test surface, for example but not necessarily in a direction generally normal to the test surface.

In a preferred arrangement, the predetermined relative displacement between the pivotal mounting and the test surface is effected by a pivotal movement or by a movement equivalent to such a pivotal movement, about an axis which lies generally parallel to the test surface and is intersected by the normal to the test surface substantially at the point of such surface engaged by each of the two tracers in the operative condition thereof. With this arrangement, the two tracers are in engagement with the same point of the test surface respectively at corresponding instants of the successive traversing drives, so that it is not necessary in the comparing means to compensate for the separation of such two tracers along the length of their supporting arm. Furthermore, the individual working movements of the two tracers, at corresponding instants of the successive traversing drives, are effected relative to identical parts of the substantially straight path along which the pick-up body is moved, so that when such path is used to constitute the datum for measurement, small errors in the straightness thereof cancel out and do not affect the accuracy of such measurement.

If desired, the pivotal mounting for the supporting arm may be carried by the pick-up body for movement relative thereto, the changeover means acting to effect movement of such pivotal mounting relative to the pick-up body between two stop positions. Alternatively however, the pick-up body carrying the pivotal mounting may be mounted to undergo the predetermined displacement relative to the test surface. For example, such pick-up body may be mounted to undergo the predetermined displacement relative to a member through which the traversing drive is imparted to such pick-up body.

In the preferred arrangement, the pick-up body is pivotally mounted on the traversing member to move relatively thereto about the axis which lies generally parallel to the test surface and is interested by the normal to the test surface substantially at the point thereof engaged by each of the two tracers in the operative condition thereof, and the changeover means acts to effect movement of the pick-up body relative to the traversing member along an arcuate path between two stop positions. This arrangement thereby has the further advantage that the level of the output measurement is not affected by changeover from one tracer to the other, since the effective zero of the detecting means is the same with the stylus operative as with the skid operative.

In other arrangements, means are preferably provided for equalising the effective zero of the detecting means respectively when the stylus is operative and when the skid is operative, if otherwise the level of output measurement would be altered by changeover. For example, in an alternative arrangement in which the predetermined displacement between the pivotal mounting and the test surface is effected by movement of the pivotal mounting relative to the pick-up head in a direction generally normal to the test surface, the detecting means comprises a differential electrical detector which is connected in an electrical bridge circuit effectively including in at least one arm an impedance which is switched in or switched out when the changeover means is operated. Further, in this alternative arrangement, it is necessary to take account of the separation of the tracers in comparing the outputs of the detecting means during the successive traversing movements.

The apparatus preferably includes a switching device for effecting operation of the changeover means automatically after completion of the first of the two successive traversing drives. In addition, the changeover means may conveniently include a retarding device for ensuring that the tracer operative during the second traversing drive is brought gently into engagement with the test surface after completion of the first traversing drive.

Furthermore, a timing switch may be provided in the output circuit of the detecting means, such switch being controlled by a cam device driven in synchronism with the driving means, whereby the two outputs fed to the comparing means respectively during the two successive traversing drives are representative of the working movements of the two tracers along the same path of predetermined length and position on the test surface. Equality in the timing of the two outputs to be compared is especially important for obtaining an average measurement of the roughnesses of the test surface. For this purpose for example, the comparing means may conveniently include two integrating devices respectively for receiving the outputs of the detecting means during the two successive traversing drives, and a meter for indicating the difference in such integrated outputs.

The comparing means may conveniently also include a recording device driven in synchronism with the traversing device and to which is fed the output of the detecting means during traversing of one tracer, and a switching device whereby the recorded output is fed from such recording device during traversing of the other tracer in phase with the output of the detecting means during such traversing of the other tracer. When, as above mentioned, it is necessary to take account of the separation of the tracers in the differential measurement, the recording device may conveniently comprise a magnetic recorder having a recording head to which is fed the output of the detecting means during traversing of one tracer and a reproducing head from which is fed the stored output during traversing of the other tracer, the recording head and the reproducing head being separated in the direction of movement of the recorder by a distance equivalent to the separation in the direction of traversing of the stylus and the skid.

When, as for example in the preferred arrangement, the predetermined relative displacement of the pivotal mounting and the test surface is effected by movement of the pick-up body relative to the traversing member through which the traversing drive is imparted to such pick-up body, it is possible to provide an alternative datum for the working movements of the tracers. For this purpose, the traversing member is flexibly mounted relative to the test surface and a supplementary skid is provided for engagement with such test surface, such supplementary skid being carried by the traversing member and affording a common datum respectively for the working movements of the two tracers during the successive traversing drives.

Figure 5:
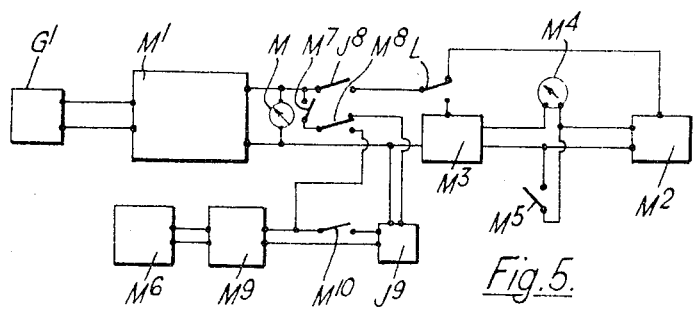
Figure 6:
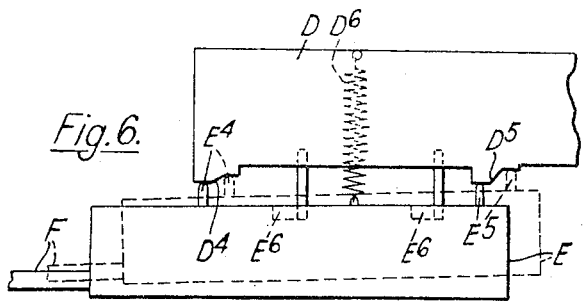
Figure 7:
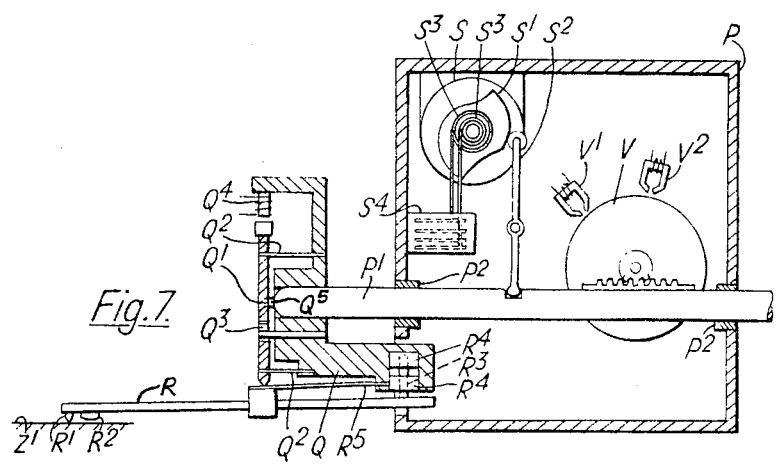
Figure 8:
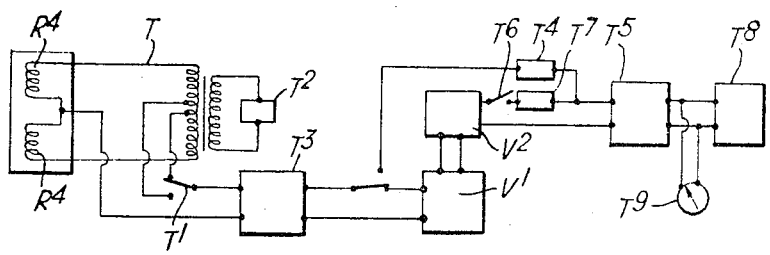

The invention may be carried into practice in various ways, but two practical arrangements of surface testing apparatus according thereto will now be described by way of example with reference to the accompanying drawings, in which FIGURE 1 shows in side elevation a preferred arrangement comprising an apparatus support, a casing adjustably mounted on such support, and pick-up unit with alternatively operated stylus and skid carried in front of such casing, FIGURE 2 shows the pick-up unit in enlarged vertical section, FIGURE 3 diagrammatically illustrates, in a much exaggerated manner, the action of changeover from stylus to skid at the pick-up unit, FIGURE 4 shows in enlargement the interior of the apparatus casing, FIGURE 5 is a diagram of an electricrl circuit including a measuring instrument giving an output indication dependent on the difference between the working movement of the stylus and of the skid, FIGURE 6 shows diagrammatically a modification of the preferred arrangement, FIGURE 7 shows in vertical section an alternative arrangement, the apparatus support being omitted for convenience, and FIGURE 8 is an electrical circuit diagram including a measuring instrument for the alternative arrangement.

In the preferred arrangement shown in FIGURE 1, the main parts of the apparatus are carried by a casing B mounted for vertical adjustment on a column $A^1$ by means of a vertical screwthreaded shaft $A^2$ rotatable by a handwheel $A^3$. The casing B is detachably mounted in a fitting $A^5$ on a support plate $A^4$ fixed to an internally screwthreaded collar $A^6$ cooperating with the shaft $A^2$, the plate $A^4$ bearing against the column $A^1$ so as to be held against rotation relatively to such shaft. A clamping screw $A^7$ is provided for clamping the collar $A^6$, and thus the support plate $A^4$ and casing B, in the chosen position of vertical adjustment. The column $A^1$ is upstanding from a table A which forwardly of the column constitutes a workpiece support, a workpiece carrier $A^8$ being movably mounted on such table and being provided with a locking element $A^9$ by means of which such carrier can be locked in a chosen position on the table in front of the casing B.

As also shown in FIGURES 2 and 4, a generally horizontal shaft C is mounted for axial sliding movement in bearings $B^1$ provided in the front and rear walls of the casing B, and carries a frame D at its forward end outside the casing, such frame in turn carrying a pick-up body E beneath its front end. The frame D is attached to the slidable horizontal shaft C by means of connecting ligament hinge $C^1$ biassed to maintain such frame in engagement with a releasable abutment $C^2$ on the shaft. Beneath the pick-up body E, an arm F extends generally horizontally and forwardly, this arm being hinged at an intermediate point $F^3$ in its length to the pick-up body so as to be free to pivot relatively thereto about a generally horizontal transverse axis. At its front end, the arm F carries a downwardly directed stylus $F^1$ and a downwardly directed rounded skid $F^2$, the skid being adjacent but just to the rear of the stylus. Relative to their supporting arm F, the tips of the stylus $F^1$ and the skid $F^2$ are located at the same level. Above its rear end the supporting arm F carries the armature G of an electrical detector, the stator $G^1$ of such detector being carried by the rear end of the pick-up body E. The hinge connection $F^3$ between the pick-up body E and the supporting arm F for the stylus $F^1$ and skid $F^2$ conveniently consists of a spring ligament, which may be formed with a set bias to urge the stylus and skid downwardly towards the test surface $Z^1$ on a workpiece Z on the carrier $A^8$ on the work table A. Alternatively however, a separate biassing spring may be provided for the latter purpose.

The pick-up body E is suspended from its supporting frame D by means of a pair of spaced ligament linkages $E^1$, inclined to one another at a small angle. By means of such linkages $E^1$, the pick-up body E is movable relatively to the frame D between two operative positions, effectively about a generally horizontal pivot axis located directly above the point of the test surface $Z^1$ which is engaged by the stylus $F^1$ in one such operative position of such pick-up body and by the skid $F^2$ in the other operative position of such pick-up body. In FIGURE 3 the second operative position of the pick-up body E is shown in chain line, the pivot axis about which the pick-up body moves being indicated at $E^2$. Since for the avoidance of obscurity it is not practical to show the stylus $F^1$ and skid $F^2$ on a sufficiently small scale relative to the remainder of the apparatus, and likewise the small separation between such stylus and skid, the displacement between the two operative positions of the pick-up body E is greatly exaggerated in this figure. The operative positions of the pick-up body E are determined by stops constituted by the ends of a slot $E^3$ in the pick-up body E wherein engages a pin $D^1$ carried by the frame D. In order to ensure that the stylus $F^1$ and the skid $F^2$ engage exactly the same point of the test surface $Z^1$ respectively in the two operative positions of the pick-up body E, the pivot axis $E^2$ about which the pick-up body moves is required to be precisely located. For this purpose, one of the linkages $E^1$ is capable of fine adjustment slightly to vary its angle of inclination to the other linkage $E^1$, this adjustment being carried out using an optical flat as a workpiece. The fine adjustment means conveniently comprises a cylindrical holder $D^2$ for the end of one of the linkages $E^1$ attached to the frame D, this holder being rotatable and being associated with a locking screw $D^3$ for locking it in the chosen position of adjustment.

With the above-described arrangement, the pick-up body E moves relatively to its supporting frame D through a short arcuate path, inclined upwardly relative to the test surface $Z^1$ and of predetermined length, in changeover from one operative position to the other. In the upper operative position, the supporting arm F for the stylus $F^1$ and skid $F^2$ is so inclined to the horizontal that the stylus $F^1$ engages the test surface $Z^1$, while in the lower operative position, such supporting arm is so inclined that the skid $F^2$ engages the test surface $Z^1$. However, in such two operative positions, the relative positions of the pick-up body E and the supporting arm F are the same, so that the effective zero of the detector G, $G^1$ is unaffected by changeover.

The means for effecting changeover from one tracer to the other comprises a lever H pivoted to the supporting frame D for the pick-up body E and having a coupling in the form of an elastic element $H^1$ to such pick-up body. The lever H is biassed by means of a spring $H^2$ normally to maintain the pick-up body E in the lower operative position in which the skid $F^2$ engages the test surface $Z^1$. A shaft-mounted press button $H^3$ on the frame D can be depressed to move the lever H against the force of its biassing spring $H^2$ thereby to raise the pick-up body E to the upper operative position in which the stylus $F^1$ engages the test surface $Z^1$. A lever catch $H^4$ loaded by a spring $H^5$ is provided to hold the press button $H^3$ in its depressed condtiion for as long as required, and the shaft $H^6$ of such press button is conveniently surrounded by a dash-pot device $H^7$ which acts to minimize shock on changeover.

Axial movement of the shaft C carrying the frame D supporting the pick-up body E is effected by means of an electric motor J housed within the casing B, as will be later described. When such axial drive is applied to the shaft, the pick-up body E is moved in a substantially straight path to cause either the stylus $F^1$ or the skid $F^2$ to traverse the test surface $Z^1$, depending on the position of the pick-up body E relative to its supporting frame D. To effect measurement of the test surface, the stylus $F^1$ and the skid $F^2$ are successively traversed across the test surface $Z^1$ during successive traversing drives, between which the changeover means H is operated. The outputs of the detector G, $G^1$ during the two traversing drives are compared in a manner later discussed.

With the above-described arrangement, the individual working movements of the stylus $F^1$ and skid $F^2$, at corresponding points of the test surface $Z^1$ during the successive traversing drives, are effected relative to identical parts of the datum, i.e. the substantially straight path along which the pick-up body E is moved, so that since the required measurement is a comparison of the two outputs during the two successive traversing drives, small errors in the straightness of the datum cancel out and do not effect the accuracy of measurement. Furthemore, the direct comparison between the outputs is facilitated by the fact that, as previously mentioned, the effective zero of the detector G, $G^1$ is not altered when changeover from stylus $F^1$ to skid $F^2$ is effected.

The successive traversing drives of the shaft C carrying the pick-up body E are conveniently effected through an eccentric cam device K which in making one revolution causes one complete forward and backward movement of the shaft C through a roller $K^1$, spring loaded to maintain engagement with the cam device K, and a transmission arm $K^2$. The cam device K is driven from a control disc $J^1$ through gearing $J^2$ having a 1:2 ratio, such control disc being in turn driven from the electric motor J. The control disc $J^1$ is provided with detent notch $J^3$ for cooperation with a spring loaded starting lever $J^4$, which is associated also with a switch $J^5$ for starting and stopping the motor J. In addition, the control disc $J^1$ has two cam tracks $J^6$, in the form of arcuate tracks extending over nearly 90 degrees and in diametrically opposite positions, with which cooperates an element $J^7$ controlling a switch $J^8$ in the output circuit of the detector G, $G^1$ A further switch L in such circuit, being a time control switch, is operated by a further cam $L^1$, driven either from the traversing shaft C or by the cam device K through the roller $K^1$ and transmission arm $K^2$.

Before use, the apparatus is first adjusted so that, with the optical flat in place of the test surface, equal outputs are obtained from the stylus $F^1$ and the skid $F^2$ during the successive traversing drives, i.e. a reading of zero is obtained at a final indicating meter.

In use, the press button $H^3$ on the frame D supporting the pick-up body E is first depressed to bring the stylus $F^1$ into its operative condition. The relative levels of the apparatus and test surface $Z^1$ are then adjusted, by vertical adjustment of the casing B on the column $A^1$, to obtain a suitable reading at a direct reading meter M fed with the output of the detector G, $G^1$ through an amplifier $M^1$ (see FIGURE 5). The starting lever $J^4$ is then operated, effecting disengagement thereof from the detent notch $J^3$ in the control disc $J^1$ and also actuation of the switch $J^5$ controlling the motor J to effect starting thereof. The traverse having started, the element $J^7$ engages one of the cam tracks $J^6$ in the control disc $J^1$ to operate the switch $J^8$ associated therewith to prepare a circuit for feeding the output of the amplifier $M^1$ to an integrator $M^2$. The time control switch L is then operated to complete such circuit. After a suitable period, the circuit to the integrator $M^2$ is broken at the time control switch L, and the preparing switch $J^8$ also reverts to its open condition when the element $J^7$ controlling such switch reaches the end of the first cam track $J^6$ in the control disc $J^1$. Just before the end of traverse a fixed abutment $B^2$ on the casing B operates the lever catch $H^4$, travelling with the supporting frame D for the pick-up body E during traversing, for the changeover press button $H^3$. The skid $F^2$ is thus brought gently into the operative position, under the control of the dash-pot $H^7$ associated with the press button, this being completed by the end of the return traversing movement. At this time the control disc $J^1$ has rotated through 180 degrees, but the cam device K driving the shaft through the roller $K^1$ and transmission arm $K^2$ has rotated through 360 degrees. A second traversing movement is now effected automatically, with the skid $F^2$ in its operative condition. During such second traversing movement, the switch $J^8$ associated with the element $J^7$ cooperating with the cam tracks $J^6$ on the control disc $J^1$ first prepares for the feeding of the output of the amplified $M^1$ to a second integrator $M^3$, and the period for which such output is fed to such integrator is determined by the time control switch L. Since the same time control switch L is used during the two traversing movements, it is ensured that integration is effected for exactly the same period during each such traversing movement. After such period has elapsed, towards the end of the second traversing movement, the switch $J^8$ again reverts to its open condition, and finally, at the end of the second return stroke, the starting lever $J^4$ re-engages the detent notch $J^3$ in the control disc $J^1$, thereby operating the switch $J^5$ controlling the motor J to effect stopping thereof. The differential output of the two integrators $M^2$ and $M^3$ is fed to the final indicating meter $M^4$, the reading of which is representative of the difference in the average outputs of the stylus and the skid. When the reading has been taken, the integrators $M^2$ and $M^3$ can be discharged by means of a push-button switch $M^5$.

Apart from the direct reading meter M fed from the amplifier $M^1$ throughout both traversing movements, the amplifier output may alternatively or additionally be fed to an electrical pen recorder $M^6$ (not shown in detail but generally of the kind well known in the art), conveniently either having a drum which rotates once with each traversing movement so that the outputs of the stylus and the skid may be superimposed on a single record chart, or alternatively, as in the arrangement described below, a drum which rotates only during the second traversing movement directly to record the differences between the working movements of the stylus and the skid. For the purpose of operating such pen recorder $M^6$, a recording device, conveniently a magnetic recorder $J^9$ having a combined recording and reproducing head $J^{10}$ but alternatively a film recorder or any other recorder suitable for the purpose, is provided in the casing B. This recording device $J^9$ is driven in synchronism with the traversing drives by means of a rack and pinion coupling $J^{11}$ to the shaft C. As shown in FIGURE 5, by means of a push-button switch $M^7$ operable at will, the output of the amplifier $M^1$ may be taken to a change-over switch $M^8$, which during traversing of the first tracer feeds the output of the detecting means to the recorder $J^9$ and during traversing of the second tracer feeds the output of the detecting means to a differential amplifier $M^9$. During the traversing of the second tracer, operation of a switch $M^{10}$ permits the output recorded during the first traversing drive also to be fed to the differential amplifier $M^9$ so that during the second traversing drive, the pen recorder $M^6$ fed from the differential amplifier records the difference between the outputs of the stylus and the skid. The switches $M^8$ and $M^{10}$ may conveniently be operated by cam-operated means (not shown) driven from the driving means for effecting traversing, the timing being arranged so that the two signals fed to the differential amplifier $M^9$ during the second traversing drive are precisely in phase, i.e. the signal level received at the amplifier $M^9$ at any instant of time represents the difference between the outputs of the stylus and of the skid at exactly corresponding points of the test surface.

The above-described arrangement provides in the signals from the amplifier $M^9$ an accurate measure at successive instants of time of the movements of the stylus $F^1$ and skid $F^2$ approximately normal to the test surface $Z^1$ effectively as though such movements occurred simultaneously along a common normal to the test surface. The differential signal output therefore represents a measure of the roughnesses or undulations of the test surface $Z^1$ relative to a reference line derived from the locus of the rounded skid $F^2$ as it moves across the test surface.

Due to the mounting of the stylus $F^1$ and skid $F^2$ on a common supporting arm F, the pick-up may be made very compact in the region of the test surface $Z^1$ so that testing holes and other interior surfaces is facilitated.

If desired, as shown in broken line in FIGURE 2, an auxiliary skid N, with a very rounded tip for engagement with the test surface $Z^1$ just in front of the measuring stylus $F^1$, may be used to provide a datum for the working movements of the stylus $F^1$ and the measuring skid $F^2$. For example, as shown, such datum skid N may be provided on a bracket $N^1$ releasably clamped to the supporting frame D for the pick-up body E, such bracket being vertically adjustable between two positions determined by a pin and slot coupling $N^2$ in order that the datum skid may or may not be rendered operative, as required. In order for this datum skid N to be operative when lowered, the supporting frame D must be flexibly mounted relative to the test surface $Z^1$ to permit the datum skid N to follow the undulations of the test surface. With the preferred arrangement described, this flexibility may be obtained by sufficiently withdrawing the releasable abutment $C^2$ for such frame D on the traversing shaft C, thus permitting the datum skid to follow the undulations of the test surface by flexure of the ligament hinge $C'$ connecting such frame and such shaft.

A modification of the above-described arrangement is shown in FIGURE 6, wherein the pick-up body E is movable relatively to the supporting frame D between the two operative positions by means of combined sliding and tilting displacements, these two displacements being equivalent, as far as the operative positions are concerned, to an arcuate movement about a transverse axis directly above the operative tracer. In this modification, the pick-up body E is provided with a pair of transversely spaced upwardly directed locating pins $E^4$ near its front end and a single upwardly directed locating pin $E^5$ near its rear end, a spring $D^6$ acting to urge the pick-up body E upwardly so that these pins cooperate with guide surfaces $D^4$ and $A^5$ on the underside of the frame D. The front guide surface $D^4$ includes two generally horizontal end regions which are spaced both in the transverse direction and in the direction at right angles to the test surface by a gently sloped intermediate region. The rear guide surface $D^5$ includes two similar generally horizontal end regions which are spaced by a more steeply sloped intermediate region, whereby such end regions of such rear guide surface are spaced further apart in the direction at right angles to the test surface than the end regions of the front guide surface $D^4$. These end regions of the two guide surfaces $D^4$ and $D^5$ respectively determined the two operative positions of the pick-up body E, in association with pin and slot couplings $E^6$ which precisely limit the extent of the relative sliding displacement of the pick-up body E relative to the frame D. In FIGURE 6, the second position of the pick-up body E relative to its supporting frame D is indicated in broken line.

An alternative arrangement of surface testing apparatus will now be described with reference to FIGURE 7. In this arrangement, a generally horizontal shaft $P^1$ is mounted for axial sliding movement in bearings $P^2$ provided in the front and rear walls of a casing P, and carries a pick-up body Q at its forward end outside the casing. The casing may conveniently again be mounted for vertical adjustment on a supporting column, although this apparatus support is for convenience omitted in the drawing. Adjacent to its front face the pick-up body Q carries a generally vertical pivot member $Q^1$, such member being movable in the vertical direction relative to the pick-up body by flexure of a pair of spring ligaments $Q^2$ lying in spaced horizontal planes. The vertical displacement of the pivot member $Q^1$ which may be effected is limited by a pin and slot coupling $Q^3$ which determines upper and lower operative positions of such pivot member. The lower end of the pivotal member $Q^1$ is formed as a knife edge pivot for an intermediate point in the length of an arm R extending very approximately in the horizontal direction forwardly from the casing P, such arm as before carrying at its front end a downwardly directed stylus $R^1$ and downwardly directed rounded skid $R^2$, the skid being adjacent but just to the rear of the stylus. Above its rear end this supporting arm again carries the armature $R^3$ of an electrical detector, the stator $R^4$ of such detector being carried by the rear end of the pick-up body Q. The supporting arm R is maintained in engagement with its pivot by means of a spring ligament $R^5$, and is biased by a spring or by gravity about such pivot to urge the stylus $R^1$ and skid $R^2$ downwardly towards the test surface. The arrangement is such that, when the pivot member $Q^1$ is in its upper operative position (as shown), the supporting arm R is so tilted that the stylus $R^1$ is caused to engage the test surface $Z^1$ but the skid $R^2$ is just clear of such test surface $Z^1$, whilst when the pivot member $Q^1$ is in its lower operative position, the supporting arm R is so tilted that the skid $R^2$ is caused to engage the test surface $Z^1$ but the stylus $R^1$ is just clear thereof. Displacement of the pivot member $Q^1$ relative to the pick-up body Q is conveniently effected by means of a solenoid $Q^4$, such pivot member being spring urged, for example by a set bias of the ligaments $Q^2$, into the lower operative position and raised into the upper operative position by energisation of such solenoid when a switch is actuated. For the avoidance of shock on changeover, means may conveniently be provided for damping the movement of the pivot member $Q^1$. For this purpose, the end face of the shaft $P^1$ adjacent to the pivot member $Q^1$ is convexly rounded so that a liquid drop $Q^5$, engaging between such end face and the surface of the pivot member, is retained in position by surface tension. Thus, when changeover from one tracer to the other is effected, the displacement of the pivot member $Q^1$ relative to the shaft $P^1$ subjects the liquid drop $Q^5$ to shear stress which, by virtue of the viscosity of the liquid, tends to resist such relative displacement.

Axial movement of the shaft $P^1$ carrying the pick-up body Q is effected by means of an electric motor S housed within the casing P, as will be later described. When such axial drive is applied to the shaft $P^1$, the supporting arm R is moved very approximately lengthwise to cause either the stylus $R^1$ or the skid $R^2$ to traverse the test surface $Z^1$, depending on the position of the pivot member $Q^1$ relative to the pick-up body Q. To effect measurement of the test surface $Z^1$, the skid $R^2$ and the stylus $R^1$, preferably in that order, are successively traversed across such test surface during successive traversing drives, and the outputs of the detector $R^3$, $R^4$ during such two traversing movements are compared in a manner later discussed. Provided that the movement of the shaft $P^1$ is accurately straight, so that the stator $R^4$ of the detector remains at a constant level relative to the test surface $Z^1$ during traversing, such shaft $P^1$ effectively provides a constant reference the same for the measurements respectively obtained during the successive traversing drives. In any event however, it should be mentioned that small errors in straightness in the movement of the shaft $P^1$ are not of prime importance owing to the very small separation between the stylus $R^1$ and the skid $R^2$, so that such errors appear in the two compared measurements almost in phase and therefore to a large extent cancel out. However, the effective electrical zero of the detector $R^3$, $R^4$ for the two traversing movements is required to be the same notwithstanding the difference in the mean tilts of the supporting arm respectively when the stylus $R^1$ is operative and when the skid $R^2$ is operative. This is conveniently achieved by use of a differential detector having a stator $R^4$ comprising two coaxial coils so that movement of the armature $R^3$ increases the coupling with one such coil while decreasing the coupling with the other, and, as shown in FIGURE 8, by connecting the two stator coils $R^4$ of such differential detector in an electrical bridge circuit T in which the impedances of the ratio arms, by actuation of a switching device $T^1$, have alternative values respectively corresponding to the two mean tilts of the supporting arm R. In this connection, it will be appreciated that for the avoidance of error it is important that the mean tilts of the supporting arm R, as determined by the two operative positions of the pivot member $Q^1$, be accurately predetermined. To this end the end faces of the slot of the pin and slot coupling determining the two operative positions of the pivot member are preferably formed of very hard metal or other very hard material, and a predetermined constant force is maintained, by the spring or by the solenoid, for urging the pivot member into engagement with such stops. The bridge circuit T is preferably energised from a high frequency oscillator $T^2$.

The successive traversing drives of the shaft $P^1$ carrying the pick-up body Q are again effected from the electric motor S through a cam $S^1$, which in making one revolution causes two complete forward and backward movements of the shaft $P^1$ through a crank arm $S^2$. The cam $S^1$ is shaped to effect the return drives much more quickly than the operative traversing drives. For starting and stopping, the cam may conveniently be driven through a friction clutch (not shown) and as before retained against rotation by a detent, the detent being withdrawn, manually or otherwise, to initiate the cycle, and then being released to stop the cam by re-engagement therewith at the end of the cycle.

Within the casing P, the axially driven shaft is coupled with a magnetic recorder V having a recording head $V^1$ and reproducing head $V^2$ separated in the direction of movement of the recorder by a distance corresponding to the separation of the stylus $R^1$ and the skid $R^2$ in the direction of traverse. In operation, the skid $R^2$ is first traversed across the test surface $Z^1$ and the output of the detector $R^3$, $R^4$ taken from the bridge circuit T to the recording head $V^1$ through a carrier amplifier $T^3$ and magnetic recording circuits which may be of conventional circuitry, as well known in the art. The pick-up is then returned to its starting position, the switch operated to energise the solenoid $Q^4$ controlling the pivot member $Q^1$ so as to engage the stylus $R^1$ with the test surface, and the switching device $T^1$ at the bridge cricuit T is operated. The stylus $R^1$ is then traversed across the test surface $Z^1$, and the output of the detector $R^3$, $R^4$ is taken from the bridge circuit T through the carrier amplifier $T^3$ and, after rectifying and smoothing by conventional means indicated at $T^4$, to a differential amplifier $T^5$, wherein this output is algebraically added to the output of the previous traversing drive which is taken from the reproducing head $V^2$ of the recorder, through a switch $T^6$ operated at the commencement of the second traversing drive, and also after rectifying and smoothing by means indicated at $T^7$, to the differential amplifier $T^5$. Notwithstanding the separation of the stylus $R^1$ and the skid $R^2$, the two outputs are received in phase at the differential amplifier $T^5$ owing to the separation of the recording and reproducing heads $V^1$ and $V^2$. The signal from the differential amplifier $T^5$ is taken to a graphical recording means indicated at $T^8$ and alternatively, or additionally, to meters collectively indicated at $T^9$ showing peak values, average values and other parameters of surface texture as is well understood in the art. The cam $S^1$ controlling the traversing drive is conveniently provided with cam tracks $S^3$ for controlling switching means $S^4$ which act to effect all the necessary switching operations in the appropriate sequence, including operation of the switch controlling the solenoid $Q^4$ for the pivot member $Q^1$. The cam $S^1$ may also control switches for admitting the output of the differential amplifier to integrating circuits, for a predetermined period of time, in analogous manner to the arrangement previously described.

It will be appreciated that the above-described arrangements may be modified in various ways within the scope of the invention, especially for example in regard to the manner in which the predetermined displacement between the test surface and the pivotal mounting for the stylus and skid support is effected. For example, this may be effected if desired by mounting the workpiece on a support movable, in a direction transverse but not necessarily normal to the test surface, between two operative positions.

What I claim as my invention and desire to secure by Letters Patent is:

1. Apparatus for measuring or indicating the roughness or undulations of a surface, comprising two tracers constituted by a stylus and a rounded skid adjacently mounted in fixed relationship on a common supporting arm, a pickup body carrying a pivotal mounting for the supporting arm, means for biasing said arm about such pivotal mounting to urge the tracers towards the surface under test, changeover means operatively connected to said supporting arm for effecting a predetermined relative displacement between the pivotal mounting and the test surface so that either the stylus only or the skid only is caused to engage the test surface, means for driving the pickup body to cause the operative tracer to traverse the test surface, whereby by operation of the changeover means the two tracers may be caused successively to traverse the test surface respectively during successive traversing drives, detecting means responsive to pivotal movement of the supporting arm during traversing due to the working movements of the stylus or skid in a direction generally normal to the test surface, and means for comparing the output of the detecting means during traversing of the stylus with the output of such detecting means during traversing of the skid, including a device for temporarily storing at least one of such outputs, to provide a signal for operating a measuring or indicating instrument.

2. Surface testing apparatus as claimed in claim 1, in which the predetermined relative displacement between the pivotal mounting and the test surface is effected by movement of such pivotal mounting generally in a direction transverse to the test surface.

3. Surface testing apparatus as claimed in claim 2, in which the predetermined relative displacement between the pivotal mounting and the test surface is effected between two operative positions angularly displaced from one another about an axis which lies generally parallel to the test surface and is intersected by the normal to the test surface substantially at the point of such surface engaged by each of the two tracers in the operative condition thereof.

4. Surface testing apparatus as claimed in claim 3, in which the pickup body carrying the pivotal mounting is mounted to undergo the predetermined displacement relative to the test surface.

5. Surface testing apparatus as claimed in claim 4, in which the pickup body is mounted to undergo the predetermined displacement relative to a member through which the traversing drive is imparted to such pickup body.

6. Surface testing apparatus as claimed in claim 5, in which the pickup body is pivotally mounted on the traversing member to move relatively thereto about the axis which lies generally parallel to the test surface and is intersected by the normal to the test surface substantially at the point thereof engaged by each of the two tracers in the operative condition thereof, and the changeover means acts to effect movement of the pickup body relative to the traversing member along an arcuate path between two stop positions.

7. Surface testing apparatus as claimed in claim 6, in which the traversing member is flexibly mounted relative to the test surface and a supplementary skid is provided for engagement with such test surface, such supplementary skid being carried by the traversing member and affording a common datum respectively for the working movements of the two tracers during the successive traversing drives.

8. Surface testing apparatus as claimed in claim 7, in which the comparing means includes a recording device driven in synchronism with the traversing device and to which is fed the output of the detecting means during traversing of one tracer, and a switching device whereby the recorded output is fed from such recording device during traversing of the other tracer in phase with the output of the detecting means during such traversing of the other tracer.

9. Surface testing apparatus as claimed in claim 8, including a timing switch in the output circuit of the detecting means and a cam device driven in synchronism with the driving means for operating such timing switch, whereby the two outputs fed to the comparing means respectively during the two successive traversing drives are representative of the working movements of the two tracers along the same path of predetermined length and position on the test surface.

10. Surface testing apparatus as claimed in claim 9, in which the comparing means includes two integrating devices respectively for receiving the outputs of the detecting means during the two successive traversing drives, and a meter for indicating the difference in such integrated outputs.

11. Surface testing apparatus as claimed in claim 1, including a switching device for effecting operation of the changeover means automatically after completion of the first of the two successive traversing drives.

12. Surface testing apparatus as claimed in claim 11, in which the changeover means includes a retarding device for ensuring that the tracer operative during the second traversing drive is brought gently into engagement with the test surface after completion of the first traversing drive.

13. Surface testing apparatus as claimed in claim 1, in which the predetermined relative displacement between the pivotal mounting and the test surface is effected in a direction generally normal to the test surface.

14. Apparatus for measuring or indicating the roughness or undulations of a surface, comprising two tracers constituted by a stylus and a rounded skid adjacently mounted in fixed relationship on a common supporting arm, a pickup body, a pivotal mounting for the supporting arm, means supporting such pivotal mounting on the pickup body for movement relatively thereto in a direction generally normal to the test surface, changeover means operatively connected to said supporting arm for effecting a predetermined displacement of the pivotal mounting relative to the pickup body, means for biassing the supporting arm about such pivotal mounting, whereby either the stylus only or the skid only is caused to engage the test surface, means for driving the pickup body to cause the operative tracer to traverse the test surface, whereby by operation of the changeover means the two tracers may be caused successively to traverse the test surface respectively during successive traversing drives, detecting means responsive to pivotal movement of the supporting arm during traversing due to the working movements of the stylus or skid in a direction generally normal to the test surface, and means for comparing the output of the detecting means during traversing of the stylus with the output of such detecting means during traversing of the skid, including a device for temporarily storing at least one of such outputs, to provide a signal for operating a measuring or indicating instrument.

15. Surface testing apparatus as claimed in claim 14, including means for equalising the effective zero of the detecting means respectively when the stylus is operative and when the skid is operative.

16. Surface testing apparatus as claimed in claim 15, in which the detecting means comprises a differential electrical detector which is connected in an electrical bridge circuit effectively including in at least one arm an impedance which is switched in or switched out when the changeover means is operated.

17. Surface testing apparatus as claimed in claim 16, in which the comparing means includes a recording device driven in synchronism with the traversing device and to which is fed the output of the detecting means during traversing of one tracer, and a switching device whereby the recorded output is fed from such recording device during traversing of the other tracer in phase with the output of the detecting means during such traversing of the other tracer.

18. Surface testing apparatus as claimed in claim 17, in which the recording device comprises a magnetic recorder having a recording head to which is fed the output of the detecting means during traversing of one tracer and a reproducing head from which is fed the stored output during traversing of the other tracer, the recording head and the reproducing head being separated in the direction of movement of the recorder by a distance equivalent to the separation in the direction of traversing of the stylus and the skid.

19. Surface testing apparatus as claimed in claim 15, including a switching device for effecting operation of the changeover means-automatically after completion of the first of the two successive traversing drives.

20. Surface testing apparatus as claimed in claim 19, in which the changeover means includes a retarding device for ensuring that the tracer operative during the second traversing drive is brought gently into engagement with the test surface after completion of the first traversing drive.

21. Surface testing apparatus as claimed in claim 15, including a timing switch in the output circuit of the detecting means and a cam device driven in synchronism with the driving means for operating such timing switch, whereby the two outputs fed to the comparing means respectively during the two successive traversing drives are representative of the working movements of the two tracers along the same path of predetermined length and position on the test surface.

References Cited by the Examiner

UNITED STATES PATENTS 3,087,329  4/1963  Von Grodek et al. ____ 73—105

FOREIGN PATENTS 579,002  7/1946  Great Britain.

RICHARD C. QUEISSER, *Primary Examiner.*

JERRY W. MYRACLE, *Assistant Examiner.*